US008073456B2

(12) United States Patent
Tidestav

(10) Patent No.: US 8,073,456 B2
(45) Date of Patent: Dec. 6, 2011

(54) METHODS AND ARRANGEMENTS FOR ESTIMATING UPLINK COVERAGE IN WIRELESS COMMUNICATION NETWORKS WITH DYNAMIC CELL COVERAGE

(75) Inventor: Claes Tidestav, Balsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 11/793,777

(22) PCT Filed: Dec. 22, 2004

(86) PCT No.: PCT/SE2004/001996
§ 371 (c)(1),
(2), (4) Date: May 15, 2008

(87) PCT Pub. No.: WO2006/068559
PCT Pub. Date: Jun. 29, 2006

(65) Prior Publication Data
US 2008/0310322 A1   Dec. 18, 2008

(51) Int. Cl.
*H04W 72/00* (2009.01)
(52) U.S. Cl. ........................... 455/453; 370/328
(58) Field of Classification Search .................. None
See application file for complete search history.

(56) References Cited

U.S. PATENT DOCUMENTS

| 5,179,722 | A | 1/1993 | Gunmar et al. |
| 5,293,640 | A | 3/1994 | Gunmar et al. |
| 5,710,758 | A | 1/1998 | Soliman et al. |
| 6,628,624 | B1 * | 9/2003 | Mahajan et al. ............... 370/256 |
| 7,142,868 | B1 * | 11/2006 | Broyles et al. ................. 455/453 |
| 7,158,790 | B1 * | 1/2007 | Elliott ........................... 455/446 |
| 2002/0183039 | A1 * | 12/2002 | Padgett et al. ................ 455/406 |
| 2003/0061009 | A1 * | 3/2003 | Davis et al. ................... 702/189 |
| 2005/0117516 | A1 * | 6/2005 | Yang ............................ 370/232 |
| 2007/0054670 | A1 * | 3/2007 | Kalika et al. ................. 455/446 |

FOREIGN PATENT DOCUMENTS

| EP | 1 294 208 A1 | 3/2003 |
| WO | 9534957 | 12/1995 |

OTHER PUBLICATIONS

English translation of Chinese Office Action mailed Sep. 4, 2009 in corresponding Chinese application No. 200480044698.1.
International Search Report mailed Sep. 1, 2005.
Holma et al, "WCDMA for UMTS", Radio Access for Third Generation Mobile Communications, Third Edition, John Wiley & Sons Ltd., 2004, pp. 264-268.

(Continued)

*Primary Examiner* — Huy Vu
*Assistant Examiner* — James P Duffy
(74) *Attorney, Agent, or Firm* — Nixon & Vanderhye, P.C.

(57) ABSTRACT

The present invention relates to methods and arrangements in cellular communication networks exhibiting dynamic cell coverage, in particular, to estimate the uplink coverage in a network in operation. According to the method of the present invention a received rate is determined from at least one mobile terminal being in a communication session, by measuring the number of received transport blocks during a predetermined time interval. The received rate is compared with a predetermined expected rate, and if the received rate is below the expected rate poor coverage is identified. Since the coverage is potentially load dependent an estimate of the uplink coverage has been obtained.

19 Claims, 2 Drawing Sheets

OTHER PUBLICATIONS

3GPP TS 25.321 V3.17.0 "3rd Generation Partnership Project; Technical Specification Group Radio Access Network; Medium Access Control (MAC) Protocol Specification" (Release 1999) (Jun. 2004).

3GPP Tech Spec, 25.133, V7.3.0 (Mar. 2006), 3rd Generation Partnership Project; Technical Specification Group Radio Access Network; Requirements for Support of Radio Resource Management (FDD) (Release 7).

* cited by examiner

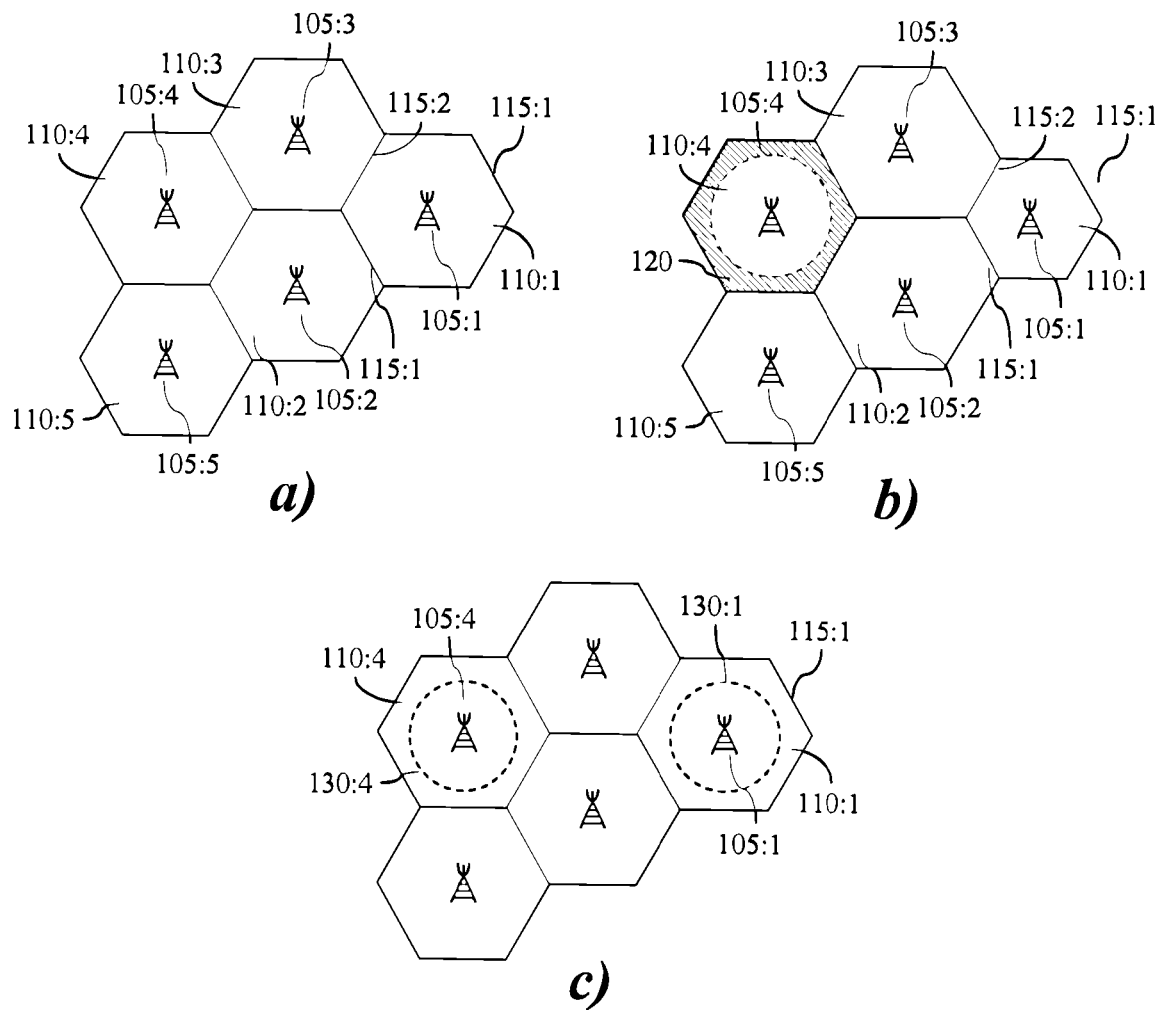
Fig. 1a-c
(PRIOR ART)
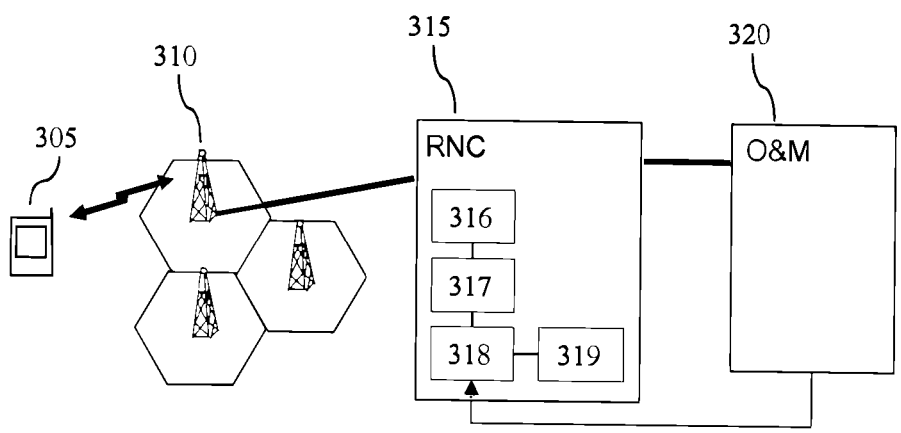
Fig. 3

US 8,073,456 B2

METHODS AND ARRANGEMENTS FOR ESTIMATING UPLINK COVERAGE IN WIRELESS COMMUNICATION NETWORKS WITH DYNAMIC CELL COVERAGE

This application is the U.S. national phase of International Application No. PCT/SE2004/001996 filed 22 Dec. 2004, the entire contents of which are hereby incorporated herein by reference.

FIELD OF THE INVENTION

The present invention relates to methods and arrangements in cellular communication networks exhibiting dynamic cell coverage. In particular the invention relates to a method and arrangement to estimate the uplink coverage in a network in operation.

BACKGROUND

Careful planning of the wireless cellular communication networks has been of high importance ever since the development of the early analog networks such as NMT and AMPS. A careful planning is equally important for today's cellular systems such as the WCDMA based UMTS and CDMA-2000, and will be as important in future systems.

As is well known, the often depicted hexagonal pattern of the base stations of a wireless network is a simplification. In reality, with for example a varying topography or a plurality of man-made obstacles such as tall houses, the demand for coverage almost everywhere, including indoors and underground etc, the planning of a network is far from trivial. In addition to the mentioned factors relating to the radio propagation properties a successful network planning must take into account the varying demands on capacity. In certain portions of the network, corresponding to densely populated areas, for example, the capacity must be higher than in more rural areas. This capacity need may shift during a day. During working hours the demand for capacity will typically be highest in for example office areas, while in the evenings and nights the demands will be very low.

The coverage area of a wireless network is defined as the area wherein the users have access to their subscribed services. It is vital both to the users and the operators of wireless network that the wireless system has adequate coverage.

In principle, improving coverage is simple, it is only a matter of deploying a sufficiently dense pattern of base stations. However, since the cost of a cellular system is to a very high degree proportional to the number of base stations, an operator tries to avoid over-dimensioning. The cost of a base station comes both from the equipment itself and its installation cost, but also to a high degree operation and maintenance costs and the cost for renting properties for the base stations. In addition environmental and esthetical issues have been raised concerning base station mast and antennas. Hence, operators strive to fulfill the coverage requirement using as few base stations as possible.

A vast number of methods and tools have been developed and deployed to estimate coverage. Three main approaches, which often are used in combination, in assessing the coverage of a network may be distinguished: propagation predictions; drive tests and traffic statistics.

Propagation predictions rely on very accurate map data, both with regards to the natural topography and to man made objects. This is an obvious starting point the planning a network, but can, although great improvements have been reported over the years, only give rough coverage predictions. This is particularly true for indoor environments.

Drive tests, which comprise of measuring the radio coverage in the field, typically by vehicle-based measuring units, give reliable data for the location of the measurement. However, to cover all parts of a network with a drive test is in practice impossible—the tests are typically confined to roads and the like. In addition, drive tests are time-consuming and expensive.

Traffic statistics are performed on a running network. Most commonly dropped calls are identified and related to a geographical area. However, the methods can not discern what caused the dropped call, and since there are many reasons for a dropped call apart from bad coverage, the dropped call statistics are a blunt instrument for cell planning purposes. In addition, a bad coverage does in certain network not necessarily, or immediately, lead to a dropped call, but degraded performance. Dropped call statistics does not account for these cases.

In practice the cell planning often involves all three approaches, the propagation predictions is performed as a first measure to plan the network; drive tests and traffic statistics are used in a later state to assess coverage of the existing network.

Cell planning has become even more complicated with the widespread use of CDMA-based access technology, such as WCDMA. CDMA systems will, due to interference-limited nature, exhibit dynamic cell coverage, i.e. the coverage of a cell will be dependent on the load in the cell. This behaviour, intrinsic to CDMA, is commonly referred to as cell breathing. Cell breathing can be accounted for in propagation predictions used for cell planning. EP 1,294,208 and U.S. Pat. No. 5,710,758 teach methods of improving commonly used simulation approaches in cell planning by incorporating the effects of cell breathing. The disclosed methods take cell breathing into account but have the drawback in common with the previously mentioned prediction methods that they for a real network, only give rough estimates of the real radio environment. Hence, methods and arrangement for improving the cell planning and/or uplink load control, based on traffic statistics and which handles the dynamic cell coverage is needed.

The technology disclosed herein provides methods and arrangement that facilitate an improved cell planning and/or improved uplink load control in cellular communication networks exhibiting dynamic cell coverage. In particular, the technology disclosed herein provides reliable traffic statistics in an up and running network.

The technology disclosed herein provides a method for estimating uplink coverage in a wireless communication system, which the exhibits load dependent cell coverage. The method gathers traffic statistics related to radio coverage in individual cells in a wireless communication system in operation, and comprises the steps of:

determining a received rate from at least one mobile terminal being in a communication session, by measuring the number of received transport blocks during a predetermined time interval; and comparing the received rate with a predetermined expected rate, and if the received rate is below the expected rate, identifying poor coverage. Since the coverage is potentially load dependent an estimate of the uplink coverage has been obtained.

Preferably, if the received rate is below the expected rate, an indication of insufficient coverage is stored for later analysis, either for cell planning purposes or radio resource management purposes such as uplink load control. Alternatively, or in combination with storing the indications of insufficient coverage, the received rate is stored. This part of the method according to an example embodiment is preferably performed in a radio network controller (RNC) node in the wireless communication system.

According to a first aspect of an example embodiment the method comprises a further step of performing a cell planning function using the stored indications on insufficient coverage and/or the stored received rates to identify areas with poor radio coverage. This is preferably performed in an O&M node which retrieves the gathered traffic statistics from the RNC.

According to a second aspect of an example embodiment the method comprises a further step of performing a load control function on the stored information to identify inadequate admission control thresholds by comparing the number of indications of insufficient coverage, or a ratio of transmissions giving rise to indications of insufficient coverage compared to the total number of transmissions, with a predetermined load value, said load control function performed per cell, and suggesting a lowering of the admission control threshold if the load control function has identified an inadequate admission control threshold for the cell. The load control function is preferably performed in the RNC.

According to a third aspect of an example embodiment the method of present invention the step of comparing comprises the substeps of:
comparing the received rate of a first TTI and the received rate of a second consecutive TTI with the expected rate;
determining if the received rate of the second TTI is zero, and storing an indication of insufficient coverage and/or the received rate only if the received rate of both the first and second TTI are below the expected rate and the rate of the second TTI is nonzero, whereby discerning between low received rate due an ending transmission and low received rate possibly due to poor coverage. In the case of low received rate due to an ending transmission the rate of first TTI may be below the expected rate, but the rate of consecutive second TTI will in that case be zero.

Thanks to the technology disclosed herein it is possible to estimate the uplink coverage from traffic statistics in an up and running network in a way that does not require control signalling over the air interface.

One advantage afforded by the technology disclosed herein is that the method may be used for an improved cell planning as it gives an estimate of the load dependency of the cell coverage for the cells in the wireless system.

Yet another advantage afforded by the technology disclosed herein is the ability, according to one embodiment, to discern between low received rate due an ending transmission and low received rate possibly due to poor coverage.

A further advantage is that the technology disclosed herein can be utilized to improve the radio resource management procedure such as admission control.

Further advantages and features of example embodiments of the technology disclosed herein will become apparent when reading the following detailed description in conjunction with the drawings.

BRIEF DESCRIPTION OF THE DRAWINGS

FIGS. 1a-c is a schematic illustration of cell breathing in a cellular network in which the methods and arrangements according to example embodiments may advantageously be applied;

FIG. 3 is a schematic illustration of a system according to an example embodiment.

DETAILED DESCRIPTION

Figure 2:
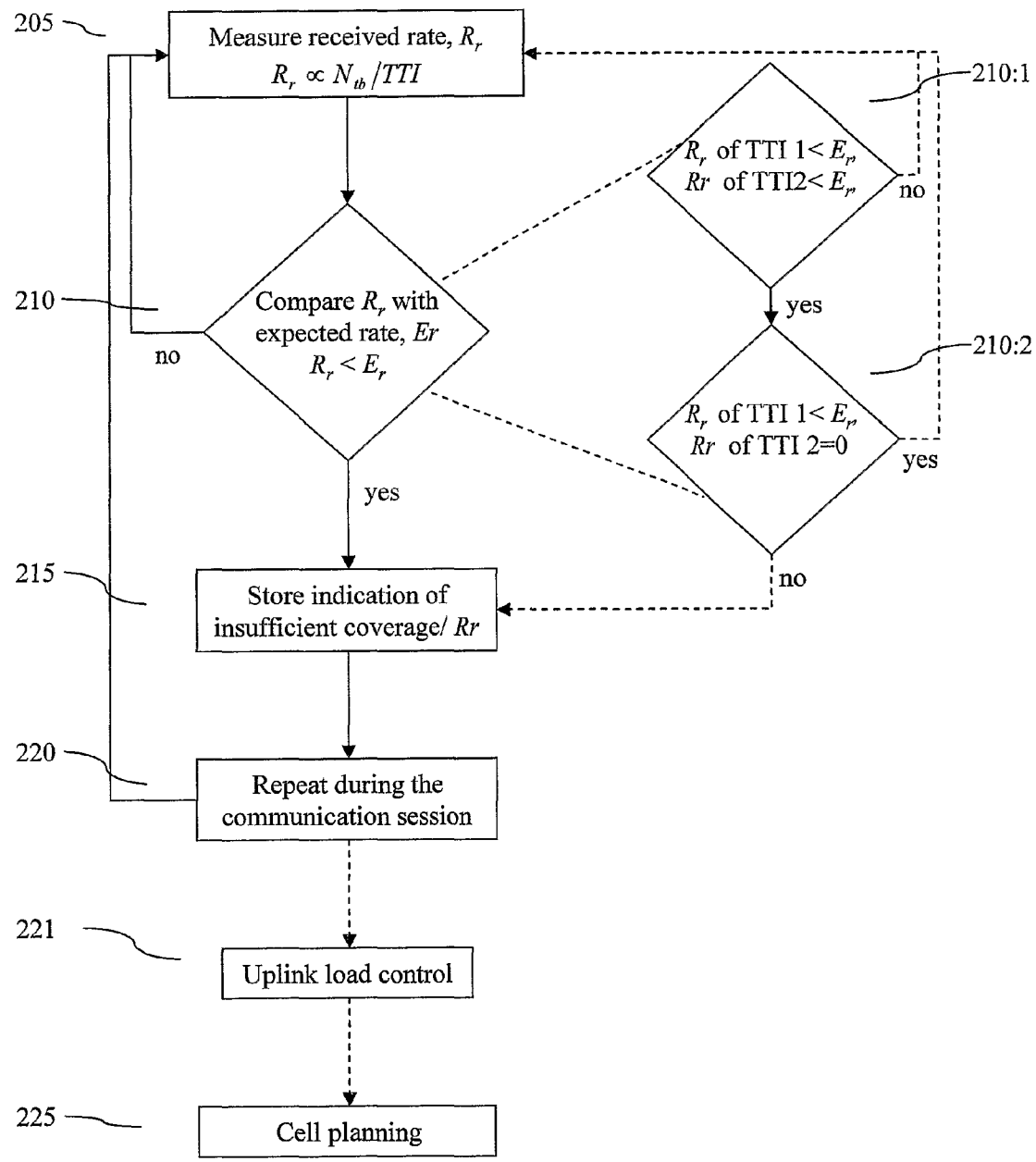
FIG. 2 is a flowchart of the method according to an example embodiment.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Power control is an essential feature in all CDMA-based wireless technologies, not the least being WCDMA. Power control is utilized in both downlink and uplink. The principles for the power control are fairly simple, although the implementation is far from trivial, mainly due to the speed at which the power control needs to be performed and the fact that all changes in transmit power in principle effects all entities in a cell. In a simplified power control scheme a transmitter sends its signal with a certain transmit power. The receiver estimates the quality of the received signal, and if the signal is poor the receiver request the sender to increase its transmit power. On the other hand, if the receiver determines the signal as being unnecessarily strong, the receiver request the transmitter to lower its transmitting power.

When a transmitter, either in a base station or a mobile terminal, uses its maximum transmit power, which may be the maximum allowed transmit power—not necessarily the maximum in power capacity, it is of course not possible to further increase the power as a response to power control demands from the receiver. If the situation persists, it is probable that it is impossible to maintain the communication quality. Eventually, the coverage is lost and the user will be dropped. This situation may occur both in uplink and downlink.

The aim of the cell planning is, as described in the background section, to provide coverage. However, coverage problems as described above will occur in all networks, especially in newly implemented networks or if changes have been made to the network or to the radio environment which the network operates in. Preferably coverage problems should be detected as early as possible in order to avoid severe problems. This is possible in downlink, since the network, through the base station and Radio Network Controller (RNC), has access to accurate information about the base station transmit power, which determines the downlink coverage. If the system, even at low load, operates close to the maximum code power, i.e. the maximum transmit power that is allocated to any particular user, it is a clear indication on inadequate coverage, and that it will be difficult to guarantee the service quality at high load. Analysis like this is typically performed for cell planning purposes in a O&M-node, based on reports from the RNC.

In uplink, the above described downlink method is not feasible, since the network does not normally have knowledge of the transmit power used by each individual mobile terminal. In principle, it would be possible to order each mobile to include their used transmit power in measurement reports sent to the network. However, in practice it would not be feasible to report this quantity sufficiently often, since it would require a substantial control signaling over the air interface that would consume an unjustifiably large amount of the scarce radio resource.

A cause of unintended poor coverage in CDMA-based networks is the above described cell breathing. The effects causing the dynamic cell coverage are well understood, but it is very complex to exactly predict the effect on the actual coverage in a real cellular network. In FIG. 1a-c a cellular network is schematically illustrated. A plurality of base stations 105:1-5 serves their respective cells 110:1-5, defined by cell boundaries 115. The cell boundary between two adjacent cells 115:1, 115:2 is typically defined as the location where the signal strength from the two adjacent base stations 105:1 and 105:2 are equal. In FIG. 1a a situation is represented wherein the load is moderate in all cells. In FIG. 1b the load has increased and in cells 110:1 and 110:4 to a degree that the coverage has been affected—the cell breathing has caused the cells to shrink. In some cases this only leads to a movement of the cell boundary, as in the example between cells 110:1 vis-à-vis cells 110:2 and 110:3. In other cases the shrinking of the cells may result in areas that has no coverage, as indicated by the dashed areas 120, in cell 110:4.

In advanced CDMA-systems such as WCDMA a multitude of transmission rates are handled by the system. A base station may for example provide high transmission rate services in a small area and lower rate transmission services in a larger area. In FIG. 1c the base stations provide high transmission rate service all through the network, provided the load is moderate. If the load is increased a situation occurs then certain base stations, illustrated by base stations 105:1 and 105:4 in cells 110:1 and 110:4, respectively, can not provide the high transmission rate in all of their cells, although coverage is not completely lost in any part. This can be seen as these cells having a plurality of cell boundaries corresponding to different data transmission rates. The dashed inner circles 130:1 and 130:4 correspond to the "cell boundaries" of high transmission rate services while the outer boundaries 115:1 and 115:4 of the cell remains unchanged. The outer boundaries now represent the cell boundaries of the lower transmission rate services. In this scenario a "dropped call" due to poor coverage does not necessarily imply that the connection is dropped completely, rather that the user is not able to have access to the high transmission rate services that the user subscribe to and possibly is guaranteed by the operator. The term "insufficient coverage" will in this application be used to indicate that a user, due to poor coverage, is experiencing a lower transmission rate than the user should expect. Insufficient coverage does not necessarily lead to a dropped call.

The term "mobile terminal" should be interpreted as any user device utilizing the wireless communication system. Mobile terminals include, but are not limited to mobile phones, laptop and handheld computers with wireless communication facilities, cameras and other electronic equipment with wireless communication facilities. In addition, many other devices and machines such as vehicles, standalone measuring and production units, vending machines, etc may advantageously be provided with wireless communication facilities, and are for the purpose of this application and with regards to the communication aspects to be regarded as mobile terminals.

According to the technology disclosed herein the network, i.e. the RNC, determines the transmission rate from a mobile terminal by measuring the number of received transport blocks during a predetermined time interval. From this measure a received rate is calculated. If the received rate is lower than an expected value this is identified as an indication of insufficient coverage and reported to a traffic statistic function. The measurement and identification is done per mobile terminal. By gathering traffic statistics over a period of time, and preferably for a plurality of mobile terminals, areas or cells showing a high rate of insufficient coverage can be identified. These areas represent areas with poor coverage (for the intended services) and the operator may now take appropriate actions to improve the coverage. The actions that may be taken are as such known in the area of cell planning, for example adding new cells, adjusting/replacing antennas, adjusting admission threshold etc.

The method and arrangement will now be exemplified in a radio access network according to UMTS, which should be regarded as a non-limiting example. UMTS specific terms such as transport format (TF), transport format combination limitation (TFC limitation), transmission time interval (TTI), should be regarded as generic terms with, for the skilled person, obvious counterparts in other radio access systems. Details of the mentioned formats and protocols are to be found in the UMTS specifications 3GPP TS 25.321 and 3GPP TS 24.133.

In UMTS, the feature TFC limitation is used in the uplink. For each uplink transmission, the mobile selects one transport format, TF, for each transport channel. Each transport format is associated with a transmission rate. The higher the transmission rate, the more transmit power is required. In general, the mobile terminal uses the highest transport format, i.e. the transport format corresponding to the highest transmission rate. However, in situations when the transmission power approaches the maximum, the mobile terminal starts using a lower transport format. This is performed by sending fewer transport blocks during a TTI. For example, with a 384 kbps bearer, it is possible to transmit up to 12 transport block during 10 ms, one TTI. With the maximum transport format, the mobile terminal transmits 12 transport blocks in the 10 ms interval, but with a lower transport format, fewer transport blocks are transmitted in the time interval. This will improve the possibility of maintaining the connection, but at the cost of a lower transmission rate. The mobile terminal informs the base station of the chosen TF, which is needed for the decoding, but according to the standard TF is only used within the decoding and not reported any further.

In the method according to an example embodiment, described with reference to the flowchart of FIG. 2, the procedure of the mobile terminal changing the transport format to adjust to the coverage is utilized for gathering traffic statistics usable for cell planning. The method according to the example embodiment comprises the steps of:

205: A rate measuring function, preferably in the RNC, statistic gathering function measures, per mobile, the number of transport blocks, $N_{tb}$, received during a TTI for at least one mobile terminal with which the networks is maintaining a communication session. The number of transport blocks received divided with the length of the TTI corresponds to a received rate, $R_r$.

$$R_r \propto N_{tb}/TTI$$

210: The rate measuring function compares the received rate, $R_r$, or the received rate from a plurality of TTI's, with an expected rate, $E_r$. If the received rate, $R_r$, is below the expected rate, $E_r$, it is possible that the user experiences insufficient coverage, and the comparison may be further analyzed in the substeps of:

210:1 If the received rate, $R_r$, from at least two consecutive TTI's are below the expected rate, $E_r$, it is a possible indication of insufficient coverage.

210:2 If the received rate, $R_r$, of a first TTI is below the expected rate, $E_r$, and if the $R_r$ of a second TTI, consecutive to the first TTI, is zero, it is an indication of that the transmission from the mobile terminal is ending/has ended. The reason for the low $R_r$ of the first TTI is in this case that the mobile terminal does not have enough transport blocks to transmit, not insufficient coverage. Therefore, no indication of insufficient coverage should be reported. If the $R_r$ of the second TTI is nonzero an indication of insufficient coverage is reported (step 215).

215: If the comparison/analysis of step 210 determines insufficient coverage, an indication of insufficient coverage is reported to and stored by a statistic gathering function, preferably also residing in the RNC.

220: The steps 205 to 215 are repeated throughout the communication session. Hence, a plurality of indications of insufficient coverage may be reported for each mobile terminal and communication session.

225: In a analyzing step, typically to be taken at regular intervals or if other indications of poor coverage, for examples complaints, have been received, the statistics of the indications of insufficient coverage are analyzed. The analysis may be performed in various way, and may include comparing the number of indications of insufficient coverage per cell with the total number of transmissions in that cell to identify cells with poor coverage. The analyzing step is typically performed in, or in connection with, a cell planning function in an O&M-node, which has received the gathered statistics.

The method according to an example embodiment may be constantly activated in the wireless communication system. Alternatively the method is activated on demand, for example after initialization of a new system (or part of a system), after introduction of new base stations or antennas in an existing systems, or if indications of lost services, such as complains, have been received.

The expected rate, $E_r$, may be corresponding to the highest transport format that should be available to the user in the network or in the particular cell. Alternatively, the expected rate, corresponds to a transport format that the mobile terminal has reported to the network at communication set up as the preferred transport format for the communication session, or part of communication session.

The indication of insufficient coverage reported in step 215 indicates that the mobile terminal is not able to use the expected rate. The received rate, $R_r$, corresponds to the rate for which the mobile terminal actually has coverage. For example, if the mobile repeatedly chooses a transport format corresponding to a bitrate of 128 kbps the mobile has 128 kbps coverage. This is utilized in a further example embodiment in which steps 215 and 225 are modified according to:

215': If the comparison/analysis of step 210 determines insufficient coverage, the received rate, $R_r$, and possibly also an indication of insufficient coverage is reported to and stored by a statistic gathering function.

225': In the analyzing step of the statistics of the stored received rates, $R_r$, is analyzed to give an estimate of the coverage to be expected by for a specific transmission rate. The ratio of transmissions that exhibit the specific transmission rate is ascribed as the ratio of the cell that exhibit the specific transmission rate.

If, for example, the received rates indicate that only 2% of the transmissions that are allowed to use a 384 kbps bearer actually uses the highest transport format, the analysis in step 225' assumes that only 2% of the cell has coverage for 384 kbps. If desired, the operator may take actions to increase the 384 kbps coverage in the cell.

This analysis can be extended to a plurality of transmission rates or intervals of transmission rates, by analyzing the ratio of transmissions that exhibit a received rate in a predetermined interval and ascribing that ratio as the percentage of the cell that has coverage in the predetermined interval.

Various kinds of statistical means of the received rate, $\hat{R}_r$, may be used instead of, or in combination, with the received rate, $R_r$. For example the mean received rate for a predetermined number of consecutive TTIs. This could be useful in limiting the fluctuations in reported received rates, and whereby facilitate further statistical analysis. However, care must be taken not to use a mean that conceals the effects of poor coverage. In addition, the use of a mean value should preferably not limit the abilities to discern between low received rate due to the ending of a transmission and low received rate due to insufficient coverage (step 210:1).

In a further example embodiment the procedure of measuring received rate and comparing with an expected value is utilized for load control. Whereas the previously described example embodiments relate to cell planning and is performed in a timescale of weeks or months, load control is constantly taking place in the system, and the actions suggested by this embodiment may be performed in the timescale of an hour or a day.

As previously described, the coverage of a cell is reduced when the load in the cell increases. The effects of the dynamic cell coverage can in be mitigated by a procedure known as admission control. In cases with high load it is often preferred to rather block access of new users, than reducing the capacity or drop existing users. The admission control threshold defines the level of uplink load when the system should start blocking new users. On accepting a new access the admission control makes an estimate of how the new access will affect the total load in the cell. If the total load is estimated to exceed the admission control threshold the new access is denied. A comprehensive description of the admission control procedures is to be found in WCDMA for UMTS, ed. By Harri Holma and Antti Toskola, John Wiley & sons Ltd 2004, pp 264-268. The admission control procedure requires reliable measures on the uplink load. However, as described, such measures have not previously been available.

According to this further example embodiment the method is complemented with the step of:

221: A load control function in the RNC analysis gathers statistics of indications of insufficient coverage. The analysis is typically per base station, and comprises the substeps of:

221:1 Compare the number of indications of insufficient coverage, or a ratio of the number of transmissions giving rise to indications of insufficient coverage compared to the total number of transmissions, for a base station, with a predetermined value.

221:2 If below the predetermined value the load control function has identified an inadequate admission control threshold, and suggests a lowering of the admission control threshold.

The predetermined value is typically set by the operator of the network. It is preferably a rather small number (or ratio) in a well functioning network, but non-zero, as poor transmission will always occur in some cases, for example due to faulty user equipment. Cases, which preferably not, is made to effect the admission control threshold.

The changing of the admission control threshold can be automated or performed by a network operator, who has received information of the need of an action from the load control function. The load control function is preferably performed in the order of once per day, or a few times per day.

The use of the received rate to facilitate load control according to this embodiment may be combined with the previous use for cell planning. Alternatively only the load control or cell planning is utilised. In the case of only load control, the cell planning step (step 225, 225') is omitted.

The setting of the admission control threshold affects the outcome of the cell planning function as described with reference to FIG. 2. A low admission control threshold will result in few users experiencing insufficient coverage, but possibly too many blocked new accesses. Therefore, in evaluating the statistics of indications of insufficient coverage the value of the admission control threshold is preferably taken into account, especially if both the load control function and the cell planning function is activated in the same system.

The wireless communication system according to an example embodiment comprises a plurality of functional parts or modules, preferably implemented as software code means, to be adapted to effectuate the method according to an example embodiment. In FIG. 3 the main nodes which comprise the main functional modules, which are involved in the process of measuring and analysing the received rate, are schematically depicted. The terms "comprising" and "connected" should here be interpreted as links between functional parts and not necessarily physical connections.

A mobile terminal 305 is engaged in a communication session via the base station 310. The base station 310 delivers the decoded data to the RNC 315, from which the RNC may determine the received rate in a rate measuring module 316. In a comparing module 317 the measured received rates are compared to the expected rate. The results from the comparison module 317 are stored in the storing module 318 of the RNC 315. If the statistics of indications of insufficient coverage are used for load control, the RNC comprises a load control module 319 in connection with the storing module 318. For the purpose of cell planning the statistic gathering module 318 is accessible from an O&M node 320.

The method according to the technology disclosed herein giving a reliable estimate of the uplink coverage may be utilized in various ways, which has been exemplified in the different embodiments of the invention. A reliable estimate of the uplink coverage could be useful also for other, present or future, radio resource management and/or cell planning purposes, such as providing information to the processes of inter-system or inter-frequency handovers.

In the drawings and specification, there have been disclosed typical preferred example embodiments and, although specific terms are employed, they are used in a generic and descriptive sense only and not for purposes of limitation, the scope of the invention being set forth in the following claims.

The invention claimed is:

1. A method for estimating uplink coverage in a wireless communication system, the wireless communication system possibly exhibiting load dependent cell coverage, wherein the method comprises:
    gathering traffic statistics related to radio coverage in individual cells in a wireless communication system in operation;
    determining a received rate from at least one mobile terminal in a communication session;
    comparing the received rate with a predetermined expected rate, and if the received rate is below the expected rate, identifying a possible uplink load dependent effect on the cell coverage;
    storing an indication of insufficient coverage if the received rate is below the expected rate and/or storing the received rate if the received rate is below the expected rate;
    performing a load control function on the stored information to identify inadequate admission control thresholds by comparing a number of indications of insufficient coverage, or a ratio of transmission giving rise to indications of insufficient coverage compared to a total number of transmissions, with a predetermined load value, said load control function performed per cell;
    suggesting a lowering of the admission control threshold if the load control function has identified an inadequate admission control threshold for the cell.

2. The method according to claim 1, wherein determining the received rate from the at least one mobile terminal in the communication session comprises measuring a number of received transport blocks during a predetermined time interval.

3. A method for estimating uplink coverage in a wireless communication system, the wireless communication system possibly exhibiting load dependent cell coverage, wherein the method comprises:
    gathering traffic statistics related to radio coverage in individual cells in a wireless communication system in operation;
    determining a received rate from at least one mobile terminal in a communication session;
    comparing the received rate with a predetermined expected rate, and if the received rate is below the expected rate, identifying a possible uplink load dependent effect on the cell coverage;
    storing an indication of insufficient coverage if the received rate is below the expected rate and/or storing the received rate if the received rate is below the expected rate;
    performing a cell planning function using the stored indications on insufficient coverage and/or the stored received rates to identify areas with poor radio coverage;
    performing a load control function on the stored information to identify inadequate admission control thresholds by comparing the number of indications of insufficient coverage, or a ratio of transmission giving rise to indications of insufficient coverage compared to a total number of transmissions, with a predetermined load value, said load control function performed per cell; and
    suggesting a lowering of the admission control threshold if the load control function has identified an inadequate admission control threshold for the cell.

4. The method according to claim 3, wherein determining the received rate from the at least one mobile terminal in the communication session comprises measuring a number of received transport blocks during a predetermined time interval.

5. A method for estimating uplink coverage in a wireless communication system, the wireless communication system possibly exhibiting load dependent cell coverage, wherein the method comprises:
    gathering traffic statistics related to radio coverage in individual cells in a wireless communication system in operation;
    determining a received rate from at least one mobile terminal in a communication session;
    comparing the received rate with a predetermined expected rate, and if the received rate is below the expected rate, identifying a possible uplink load dependent effect on the cell coverage;
    storing an indication of insufficient coverage if the received rate is below the expected rate and/or storing the received rate if the received rate is below the expected rate;

wherein comparing the received rate with the predetermined expected rate comprises:
    comparing the received rate of a first TTI and the received rate of a second consecutive TTI with the expected rate;
    determining if the received rate of the second TTI is zero, and storing an indication of insufficient coverage and/or the received rate only if the received rate of both the first and second TTI are below the expected rate and the rate of the second TTI is nonzero, whereby discerning between low received rate due to an ending transmission and low received rate possibly due to poor coverage.

6. The method according to claim 5, further comprising:
performing a cell planning function using the stored indications on insufficient coverage and/or the stored received rates to identify areas with poor radio coverage.

7. The method according to claim 5, wherein in comparing the received rate with the predetermined expected rate the received rate is stored, and in the a cell planning function the stored received rates are analyzed to give an estimate of the coverage to be expected for a specific transmission rate, by ascribing the ratio of the transmissions that exhibit the specific transmission rate as the ratio of the cell that exhibit the specific transmission rate.

8. The method according to claim 5, wherein stored indications of insufficient coverage from a plurality of transmissions are used for radio resource management.

9. The method according to claim 5, wherein determining the received rate from the at least one mobile terminal in the communication session comprises measuring a number of received transport blocks during a predetermined time interval.

10. A method in a radio network controlling node in a wireless communication system, the wireless communication system possibly exhibiting load dependent cell coverage, wherein the method comprises:
    gathering traffic statistics related to radio coverage in individual cells in a wireless communication system in operation;
    determining a received rate from at least one mobile terminal in a communication session;
    comparing the received rate with a predetermined expected rate, and if the received rate is below the expected rate, identifying a possible uplink load dependent effect on the cell coverage;
    storing an indication of insufficient coverage if the received rate is below the expected rate and/or storing the received rate if the received rate is below the expected rate;
    performing a load control function on the stored information to identify inadequate admission control thresholds by comparing a number of indications of insufficient coverage, or a ratio of transmission giving rise to indications of insufficient coverage compared to a total number of transmissions, with a predetermined load value, said load control function performed per cell; and
    suggesting a lowering of the admission control threshold if the load control function has identified an inadequate admission control threshold for the cell.

11. The method according to claim 10, wherein determining the received rate from the at least one mobile terminal in the communication session comprises measuring a number of received transport blocks during a predetermined time interval.

12. A method in a radio network controlling node in a wireless communication system, the wireless communication system possibly exhibiting load dependent cell coverage, wherein the method comprises:
    gathering traffic statistics related to radio coverage in individual cells in a wireless communication system in operation;
    determining a received rate from at least one mobile terminal in a communication session;
    comparing the received rate with a predetermined expected rate, and if the received rate is below the expected rate, identifying a possible uplink load dependent effect on the cell coverage;
    storing an indication of insufficient coverage if the received rate is below the expected rate and/or storing the received rate if the received rate is below the expected rate;
    wherein comparing the received rate with the predetermined expected rate comprises:
        comparing the received rate of a first TTI and the received rate of a second consecutive TTI with the expected rate;
        determining if the received rate of the second TTI is zero, and storing an indication of insufficient coverage and/or the received rate only if the received rate of both the first and second TTI are below the expected rate and the rate of the second TTI is nonzero, whereby discerning between low received rate due an ending transmission and low received rate possibly due to poor coverage.

13. The method according to claim 12, wherein determining the received rate from the at least one mobile terminal in the communication session comprises measuring a number of received transport blocks during a predetermined time interval.

14. A radio network controller adapted for use in a wireless communication system, the wireless communication system possibly exhibiting load dependent cell coverage and comprising:
    rate measuring means adapted to determine a received rate from at least one mobile terminal being in a communication session;
    comparing means in connection with the rate measuring means, and adapted to compare the received rate with a predetermined expected rate; storing means in connection with the comparing means, and adapted to store an indication of insufficient coverage and/or the received rate, if the comparing means has found the received rate to be below the expected rate;
    the radio network controller being configured to utilize admission control, the radio network controller further comprising load control means in connection with the storing means, and adapted to compare a number of indications of insufficient coverage, or a ratio of transmission giving rise to indications of insufficient coverage compared to a total number of transmissions, with a predetermined load value and output a suggestion of a lowering of the admission control threshold if the number of indications of insufficient coverage, or a ratio of transmission giving rise to indications of insufficient coverage compared to a total number of transmissions is below the predetermined load value.

15. The radio network controller according to claim 14, wherein determining the rate measuring means is adapted to determine the received rate from the at least one mobile terminal in the communication session by measuring a number of received transport blocks during a predetermined time interval.

16. A system comprising of a radio network controller and an operation and a management node adapted for use in a wireless communication system, the wireless communication system possibly exhibiting load dependent cell coverage and comprising:
- rate measuring means adapted to determine a received rate from at least one mobile terminal being in a communication session, said measuring means arranged to measure the number of received transport blocks during a predetermined time interval;
- comparing means in connection with the rate measuring means, and adapted to compare the received rate with a predetermined expected rate; and
- storing means in connection with the comparing means, and adapted to store an indication of insufficient coverage and/or the received rate, if the comparing means has found the received rate to be below the expected rate, and the operation and management node is provided with analyzing means adapted to retrieve the stored indications of insufficient coverage and/or the received rates from the storing means of the radio network controller and identify cells with poor coverage by comparing a number of indications of insufficient coverage with the total number of transmissions.

17. A method in a radio network controlling node in a wireless communication system, the wireless communication system possibly exhibiting load dependent cell coverage, wherein the method comprises:
- gathering traffic statistics related to radio coverage in individual cells in a wireless communication system in operation;
- determining a received rate from at least one mobile terminal in a communication session;
- comparing the received rate with a predetermined expected rate, and if the received rate is below the expected rate, identifying a possible uplink load dependent effect on the cell coverage;
- storing an indication of insufficient coverage if the received rate is below the expected rate and/or storing the received rate if the received rate is below the expected rate;
- performing a cell planning function using the stored indications on insufficient coverage and/or the stored received rates to identify areas with poor radio coverage;
- performing a load control function on the stored information to identify inadequate admission control thresholds by comparing the number of indications of insufficient coverage, or a ratio of transmission giving rise to indications of insufficient coverage compared to the total number of transmissions, with a predetermined load value, said load control function performed per cell; and
- suggesting a lowering of the admission control threshold if the load control function has identified an inadequate admission control threshold for the cell.

18. A radio network controller adapted for use in a wireless communication system, the wireless communication system possibly exhibiting load dependent cell coverage and comprising:
- rate measuring means adapted to determine a received rate from at least one mobile terminal being in a communication session;
- comparing means in connection with the rate measuring means, and adapted to compare the received rate with a predetermined expected rate;
- storing means in connection with the comparing means, and adapted to store an indication of insufficient coverage and/or the received rate, if the comparing means has found the received rate to be below the expected rate;
- means for performing a cell planning function using the stored indications on insufficient coverage and/or the stored received rates to identify areas with poor radio coverage;
- means for performing a load control function on the stored information to identify inadequate admission control thresholds by comparing the number of indications of insufficient coverage, or a ratio of transmission giving rise to indications of insufficient coverage compared to a total number of transmissions, with a predetermined load value, said load control function performed per cell; and
- means for suggesting a lowering of the admission control threshold if the load control function has identified an inadequate admission control threshold for the cell.

19. A radio network controller adapted for use in a wireless communication system, the wireless communication system possibly exhibiting load dependent cell coverage and comprising:
- rate measuring means adapted to determine a received rate from at least one mobile terminal being in a communication session;
- comparing means in connection with the rate measuring means, and adapted to compare the received rate with a predetermined expected rate; and
- storing means in connection with the comparing means, and adapted to store an indication of insufficient coverage and/or the received rate, if the comparing means has found the received rate to be below the expected rate;
- wherein the comparing means is configured to:
  - compare the received rate of a first TTI and the received rate of a second consecutive TTI with the expected rate; and
  - determine if the received rate of the second TTI is zero, and storing an indication of insufficient coverage and/or the received rate only if the received rate of both the first and second TTI are below the expected rate and the rate of the second TTI is nonzero, whereby discerning between low received rate due to an ending transmission and low received rate possibly due to poor coverage.

* * * * *

UNITED STATES PATENT AND TRADEMARK OFFICE
CERTIFICATE OF CORRECTION

| | | |
|---|---|---|
| PATENT NO. | : 8,073,456 B2 | Page 1 of 1 |
| APPLICATION NO. | : 11/793777 | |
| DATED | : December 6, 2011 | |
| INVENTOR(S) | : Tidestav | |

It is certified that error appears in the above-identified patent and that said Letters Patent is hereby corrected as shown below:

In Column 2, Line 42, below "needed.", insert Heading -- SUMMARY --.

In Column 8, Line 25, delete "in be" and insert -- be --, therefor.

In Column 11, Line 20, in Claim 7, delete "the a" and insert -- the --, therefor.

Signed and Sealed this

Seventeenth Day of April, 2012

David J. Kappos
*Director of the United States Patent and Trademark Office*